March 15, 1938.   L. GOLDHAMMER   2,111,425
SMALL SIZE CAMERA
Filed Feb. 6, 1936   2 Sheets-Sheet 1
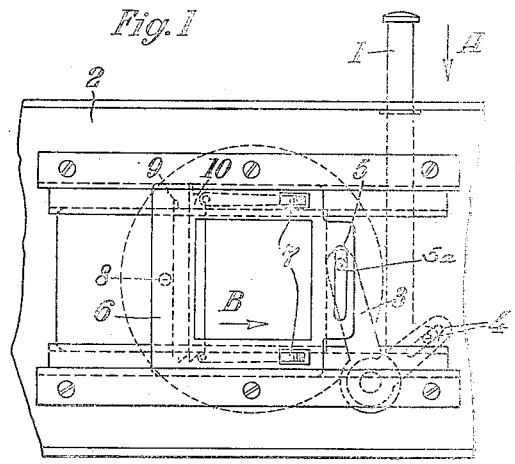
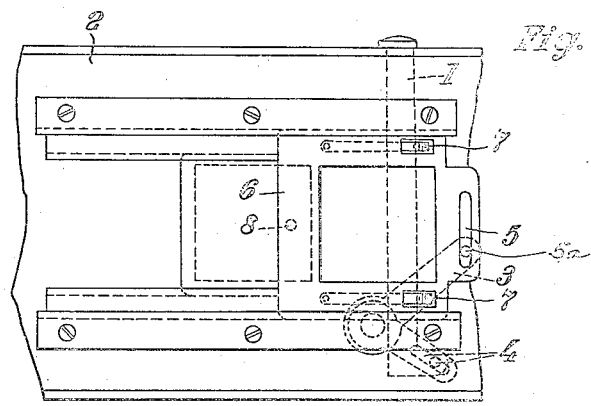
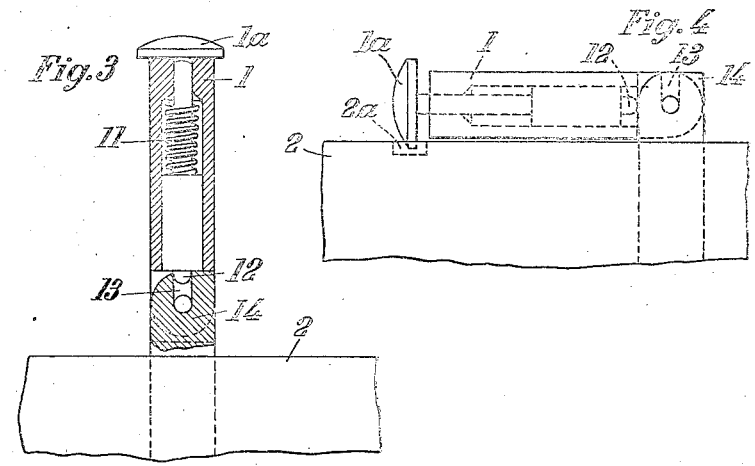
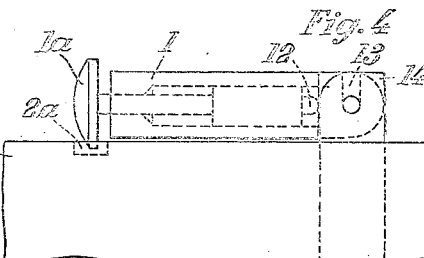
Inventor
L. GOLDHAMMER
By his Attorney P. S. Hopkins

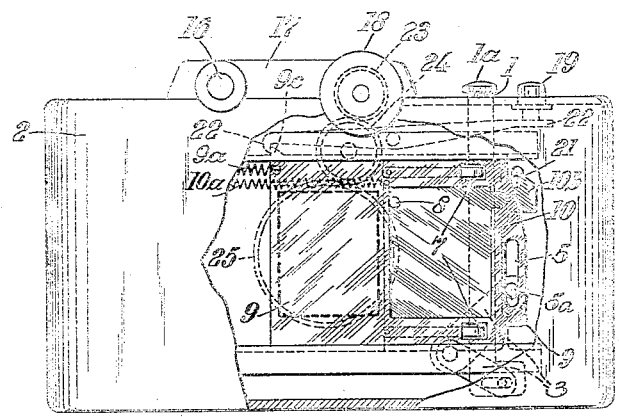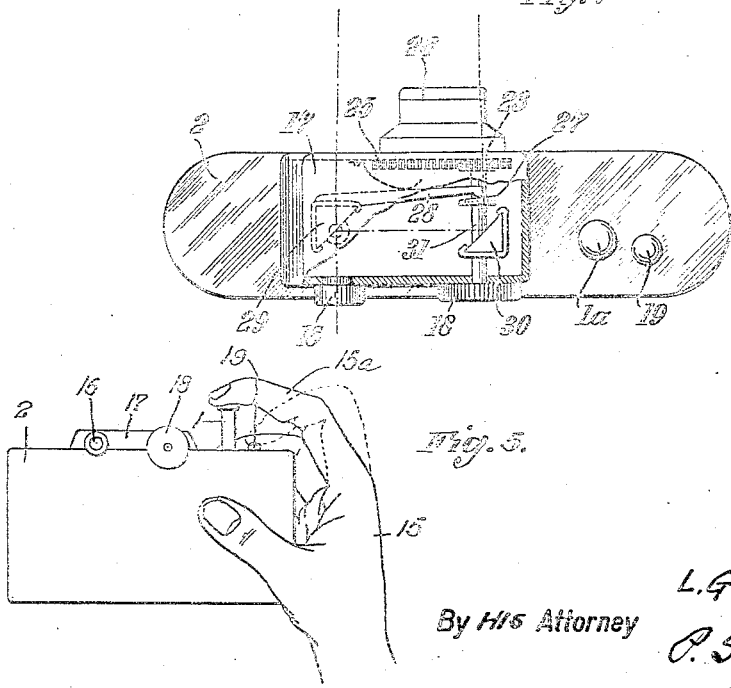

Patented Mar. 15, 1938

2,111,425

UNITED STATES PATENT OFFICE 2,111,425

SMALL SIZE CAMERA

Leo Goldhammer, Munich, Germany, assignor to Agfa Ansco Corporation, Binghamton, N. Y., a corporation of New York Application February 6, 1936, Serial No. 62,679
In Germany February 6, 1935

8 Claims. (Cl. 95—31)

This invention relates to small size camera.

One of its objects is to provide in a small size camera an improved film feeding and shutter setting mechanism. Another object is to provide a film feeding and shutter mechanism which is simple in construction and reliable in use. Still another object is to provide a film feeding and shutter mechanism which is very convenient in use. Still another object is to provide an adjusting means for the range finder coupled with the objective which is simple in construction and reliable in service. Still another object is to provide an adjusting means for the range finder coupled with the objective which can be actuated by the hand which holds the camera and with which the film feeding and shutter mechanism as well as the shutter release member are actuated.

It is already known to advance a perforated film in a roll-film camera by means of claws carried by a slide. According to the invention the setting movement is caused by a setting pin which moves in a straight line and perpendicularly to the film feed movement. The movement may be transmitted, for instance, by means of an angle-lever and by a pin and slot connection.

In order to make the camera as handy as possible, the projecting feed and setting rod is hinged and can be folded on the camera casing.

According to the invention the handling of the small size camera is essentially simplified by arranging the mechanism (push rod) by means of which the shutter is set and the film feeding (or either of these two movements) effected, in close proximity of the shutter release mechanism so that both mechanisms can be actuated immediately one after another by one finger without the necessity of changing the position of the hand which holds the camera. The setting and feeding bar and the shutter release button are preferably placed on the narrow top-side of the camera when it is held transversely and the setting and release movements are rectilinear and parallel with each other.

It is a further advantage of the new small size camera, that the dial plate of the distance meter which is coupled in known manner with the objective, is also arranged within the reach of the right hand holding the camera. In this way it is possible to carry out all adjusting movements without removing the camera from the eye.

The new small size camera is distinguished by an easy handling and simple manipulation as well as by a very reliable construction.

In the accompanying drawings two embodiments of the small size camera are illustrated.

Fig. 1 is a front view of the slide shutter with the feeding and setting mechanisms, showing the position of the parts before the shutter is set.

Fig. 2 a similar view with the shutter in set position,

Fig. 3 the setting and feeding bar ready for use,

Fig. 4 the setting and feeding bar before use,

Fig. 5 a back view of the camera held by the right hand,

Fig. 6 shows a back view partly in section of a small size camera in which the film is advanced by one of the shutter slides, part of the camera casing being broken away, and Fig. 7 shows a side view partly in section of the camera shown in Fig. 6.

The rod 1 for setting the shutter and feeding the film can be moved up and down perpendicularly to the camera casing. By an angle lever 2 and the pin and slot connections 4, 5 the setting rod is connected to the claw-slide 6, which is movable horizontally to and fro. The claw slide 6 carries resilient claw-points 7 and on the back a pin 8 for actuating the shutter slides 9, 10. When the knob 1a of the setting rod is pressed down in direction of the arrow A, the claw slide 6 and with it the shutter slides 9, 10 are moved in direction of the arrow B. The shutter can be released either by relaxing the button 1a of the setting rod or by a special release knob, which is preferably guided parallel with the setting button 1. When releasing the shutter, the claw slide 10 follows after having been released by a retarding device of the shutter.

According to the invention the movements of the directions of the setting rod and the claw-slide form an angle of 90° and are accomplished in a most simple manner and in a very short time, while the ordinary winding-up of the rubber cloth of focal plane shutters takes a lot of time because it is necessary to remove the camera from the eye. Furthermore a very compact camera results from the proposed arrangement of the various parts.

The setting and feeding rod 1 is preferably arranged on the narrow top side of the camera, when holding it transversely, so that it can be moved up and down perpendicularly to the housing.

When the camera is not used the button 1a of the feeding rod 1 is pulled out against the force of the spring 11, whereby the pin 12 comes out of the slot 13 of the bearing stand 14. Now the setting rod 1 can be folded on the camera casing in the manner shown in Fig. 4. For use the rod 1 is erected. It is secured in its upright position by an automatic snapping of the pin 12 in the slot 13 of the bearing stand 14 by the pressure of the spring 11. When the camera is not in use the button 1a of the setting rod engages a recess 2a in the camera casing.

Fig. 5 shows the camera 2, which is held by the right hand 15 and by the left (not illustrated) hand in the same manner. For making an exposure the camera is arranged with the viewing aperture 16 of the finder or of the distance meter 17 brought before the eye. After correctly adjusting the distance by means of the dial plate 18 with the forefinger 15a, the shutter setting rod 1 is pushed down, so that the film is advanced simultaneously with the setting of the shutter. Thereon the shutter can be released with the forefinger by means of the release button 19. The direction of movement of the pins 1 and 19 is rectilinear and parallel with each other. The objective may be focussed by turning the disk 18 or also by a rectilinear movement, which suitably is parallel or approximately parallel with the top edge of the camera. All movements can be made one shortly after the other and without changing the position of the camera.

In the camera shown in Figs. 6 and 7 the slide-claw of the modification shown in Figs. 1 and 2 has been omitted and the claws have been provided on one of the slides of the shutter. Furthermore Fig. 7 shows more in detail the coupling of the objective with the range finder.

Referring to Fig. 6, by means of the setting rod 5 the shutter slides 9 and 10 are brought into the set position against the tension of the springs 9a and 10a (see Fig. 6). For transmitting the perpendicular movement of the setting rod 1 into the horizontal movement of the shutter slides 9, 10, for instance, an angle lever 3 is used the pin 5a of which engages a perpendicular slot 5 of the shutter slide 9. In the set-position the hook 10b which is provided on the shutter slide 10 catches the pin 21. The shutter slide 9 possesses also a hook 9c which is caught by the hook 22a. The hook 22a is mounted on the double-armed lever 22 which is actuated by the release button 19. While setting the shutter slide 9, the shutter slide 10 is taken along by the pin 8. The perforated film is advanced by one picture frame while setting the shutter, by means of the resilient claw pins 17 which are mounted on the shutter slide.

The setting and release mechanism work in the following way:

The shutter slides 9 and 10 are brought into set condition—compare Fig. 6—by means of the setting rod 1. When setting the shutter, the film is simultaneously advanced by a picture frame by means of the claws 7. For releasing the shutter the knob 19 is pushed. By this movement the lever 22 is turned around its pivot so that the ratchet hook 22a releases the hook 9c of the shutter slide 9. The shutter slide 10 follows driven by the spring 10a more or less soon according to the adjustment of the shutter retarding mechanism (not shown) which lifts the pin 21 and thereby releases the hook 10b.

The range finder and the objective are adjusted by means of the dial 18 which is mounted on the axle 31. The axle 31 drives on the one hand the objective 26 by means of the gear wheels 23, 24 and 25, and on the other hand the prism 29 by means of the cam disk 27 and the lever 28.

The manner in which the objective and the range finder are coupled may be clearly seen from Fig. 3. The fixedly mounted prism is designated with the numeral 30.

What I claim is:

1. In a camera in combination, a casing, a gate in said casing provided with an aperture, means in said casing for advancing a film past said aperture, an objective mounted on said casing in front of said aperture, a shutter for screening off the light rays passing through said objective, and a means for simultaneously setting said shutter and actuating said means for advancing said film, said means for advancing said film and said means for setting said shutter following paths having a direction perpendicular to each other.

2. In a camera in combination, a casing, a gate in said casing provided with an aperture, means in said casing for advancing a film past said aperture, an objective mounted on said casing in front of said aperture, a shutter for screening off the light rays passing through said objective, a rod mounted in said casing and following a path perpendicular to that which is followed by said film advancing means, and an angle lever connected with said film advancing means, said shutter and said rod by means of pin and slot connections so that actuation of said rod simultaneously effects setting of said shutter and advance of said film.

3. In a camera in combination, a casing, a gate in said casing provided with an aperture, means in said casing for advancing a film past said aperture, an objective mounted on said casing in front of said aperture, a shutter for screening off the light rays passing through said objective, a rod mounted in said camera casing, not substantially standing out of said casing and following a path perpendicular to that of said film advancing means, an angle lever connected with said film advancing means, said shutter, and said rod so that actuation of said rod simultaneously effects setting of said shutter and advance of said film, and a second rod hinged to said first rod and means releasably connecting said second rod in alignment with said first rod so that said second rod can be folded on said camera casing.

4. In a camera in combination, a casing, a gate in said casing provided with an aperture, means in said casing for advancing a film past said aperture, an objective mounted on said casing in front of said aperture, a shutter for screening off the light rays passing through said objective, a means for simultaneously setting said shutter and actuating said means for advancing said film, said means for advancing said film and said means for setting said shutter following paths having a direction perpendicular to each other, and means for actuating a distance meter arranged within the reach of the hand actuating said shutter setting means.

5. In a camera in combination a casing, a gate in said casing provided with an aperture, means in said casing for advancing a film past said aperture, an objective mounted on said casing in front of said aperture, a shutter for screening off the light rays passing through said objective, a means for simultaneously setting said shutter and actuating said means for advancing said film, said means for advancing said film and said means for setting said shutter following paths having a direction perpendicular to each other, and a means for releasing said shutter in close proximity of said shutter setting means.

6. In a camera in combination a casing, a gate in said casing provided with an aperture, a slide in said casing following a straight line path, claws mounted on said slide for advancing a film past said aperture, an objective mounted on said casing on front of said aperture, a shutter for screening off the light rays passing through said objective, a rod mounted in said camera casing and following a path perpendicular to that which is followed by said slide, and an angle lever connected with said slide, said shutter and said rod by means of pin and slot connections so that actuation of said rod simultaneously effects setting of said shutter and advance of said film.

7. In a camera in combination a casing, a gate in said casing provided with an aperture, a slide in said casing following a straight line path, claws mounted on said slide for advancing a film past said aperture, an objective mounted on said casing in front of said aperture, a slide shutter for screening off the light rays passing through said objective following the same direction of path as said slide, a rod mounted in said casing and following a path perpendicular to that which is followed by said slide, and an angle lever connected with said slide, said slide shutter and said rod by means of pin and slot connections so that actuation of said rod simultaneously effects setting of said slide shutter and advance of the film.

8. In a camera in combination a casing, a gate in said casing provided with an aperture, an objective mounted in said casing in front of said aperture, two blades forming a slide shutter for screening off the light rays passing through said objective and following a straight line path, claws mounted on one of said blades of said slide shutter for advancing a film past said aperture, a rod mounted in said casing and following a path perpendicular to that which is followed by said blades, and an angle lever connected with said blades and said rod by means of pin and slot connections so that actuation of said rod simultaneously effects setting of said slide shutter and advance of said film.

LEO GOLDHAMMER.